United States Patent [19]
Kobayashi et al.

[11] Patent Number: 5,342,675
[45] Date of Patent: Aug. 30, 1994

[54] HEAT-SCREENING GLASS

[75] Inventors: Hiroaki Kobayashi, Tsukuba; Takashi Muromachi, Kawasaki; Jun Kawaguchi, Yokohama, all of Japan

[73] Assignee: Nippon Sheet Glass Co., Ltd., Osaka, Japan

[21] Appl. No.: 833,558

[22] Filed: Feb. 10, 1992

[30] Foreign Application Priority Data

Feb. 21, 1991 [JP] Japan .................. 3-049104

[51] Int. Cl.$^5$ ............................. C03C 17/34
[52] U.S. Cl. ...................... 428/216; 359/580; 359/582; 359/586; 359/589; 428/336; 428/428; 428/432; 428/697; 428/698; 428/699; 428/912
[58] Field of Search .......... 428/446, 698, 697, 699, 428/336, 912, 216, 428, 432; 359/580, 582, 589, 586

[56] References Cited

U.S. PATENT DOCUMENTS

| | | | |
|---|---|---|---|
| 3,885,855 | 5/1975 | Gross | 350/1 |
| 4,188,444 | 2/1980 | Landau | 428/429 |
| 4,239,819 | 12/1980 | Holzl | 428/469 |
| 4,568,614 | 2/1986 | Fuchen et al. | 428/450 |
| 4,668,365 | 5/1987 | Foster et al. | 428/698 |
| 4,690,871 | 9/1987 | Gordon | 428/432 |
| 4,847,157 | 7/1989 | Goodman et al. | 428/446 |
| 5,079,089 | 1/1992 | Ito et al. | 428/698 |

FOREIGN PATENT DOCUMENTS

| | | |
|---|---|---|
| 59-143372 | 8/1984 | Japan . |
| 63-206333 | 8/1988 | Japan . |
| 64-314163 | 12/1989 | Japan . |
| 2233534 | 9/1990 | Japan . |
| 558763 | 2/1975 | Switzerland . |

OTHER PUBLICATIONS

Schoenholtz et al "Plasma-Enhanced Deposition of Silicon Oxynitride Films" Thin Solid Films, 148 (1987) pp. 285-291.

*Primary Examiner*—A. A. Turner
*Attorney, Agent, or Firm*—Woodcock Washburn Kurtz Mackiewicz & Norris

[57] ABSTRACT

The present invention provides a heat-screening glass provided with a protective film having improved wear resistance and chemical resistance in comparison with a protective film of silicon dioxide. A heat-screening glass according to the present invention is composed of a transparent sheet glass and a heat-screening film coated thereon and a protective film made of silicon oxynitride as an outermost layer. The protective film is made of silicon oxynitride represented by the formula $SiO_xN_y$ (where x ranges from 0.65 to 1.25 and y ranges from 0.05 to 0.67).

4 Claims, 1 Drawing Sheet

HEAT-SCREENING GLASS

BACKGROUND OF THE INVENTION

Field of the Invention

The present invention relates to a heat-screening glass which has a chemical- and wear-resistant protective film as the outermost layer on a transparent sheet glass.

Description of the Prior Art

It is a recent practice to use a heat-screening glass coated with a heat-screening film in order to reduce the influx of solar energy through building and automotive windows. A known example of such glass is the one which utilizes the property that heat rays are reflected by a film of metal (such as Cu, Al, and Ag) or a film of metal nitride (such as titanium nitride and zirconium nitride). The other known example is the one which has, for reflection of heat rays, alternately formed films of high-refracting and low-refracting materials. If they are to be used alone, they should have good mechanical, wear, and chemical resistance, among others, scratch resistance.

To meet this requirement, there was proposed a heat-screening glass which has a thick oxide film, for example, an $SiO_2$ film thicker than 1 $\mu m$, as the outermost layer, formed on the coating layer. (See Japanese Patent Laid-open No. 206333/1988.) There was also proposed a protective film of $ZrB_xO_y$, $SnO_2$, or $SiO_2$. (See Japanese Patent Laid-open No. 314163/1989.)

However, the protective film of $SiO_2$ thicker than 1 $\mu m$ has a disadvantage of taking a long time for its coating, which leads to low productivity and high production cost. The protective film of $SnO_2$ is poor in chemical resistance, and the protective film of $ZrB_xO_y$ lacks reproducibility.

OBJECTS AND SUMMARY OF THE INVENTION

The present invention was completed to solve the above-mentioned problems associated with the prior art technology. Accordingly, it is an object of the present invention to provide a heat-screening glass provided with a protective film having good wear resistance (especially scratch resistance) and chemical resistance.

The present invention is embodied in a heat-screening glass composed of a transparent sheet glass and a heat-screening film and a protective film coated one over the other on said sheet glass, characterized in that said protective film is transparent to wavelengths of visible light and is made of silicon oxynitride represented by the formula $SiO_xN_y$ (where x ranges from 0.65 to 1.25 and y ranges from 0.05 to 0.67).

The above, and other, objects, features and advantages of the present invention, will become readily apparent from the following detailed description thereof which is to be read in connection with the accompanying drawings in which the same or corresponding parts are identified by the same reference numerals in the view.

DETAILED DESCRIPTION OF A PREFERRED EMBODIMENT

Figure 1:
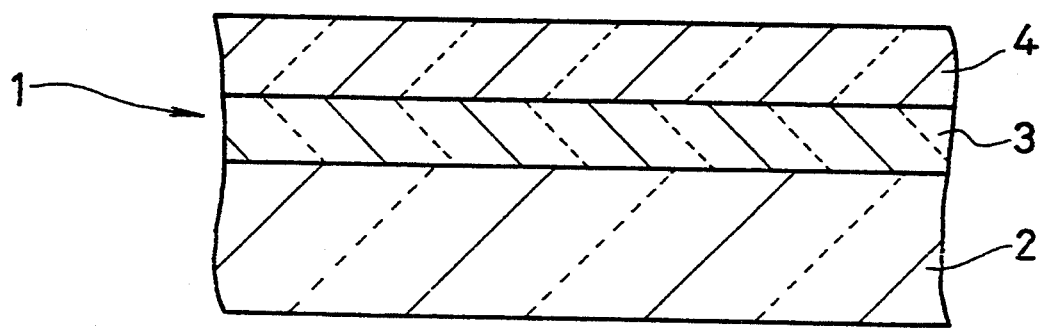
FIG. 1 is a partial sectional view of the heat-screening glass of the invention.

The heat-screening glass of the present invention has a protective film as the outermost layer which is in contact with air. This protective film is made of silicon oxynitride represented by the formula $SiO_xN_y$ (where x ranges from 0.65 to 1.25 and y ranges from 0.05 to 0.67). The ratio of oxygen to nitrogen is established so that the protective film is transparent to wavelengths of visible light. ("Being transparent to wavelengths of visible light" means that the protective film permits transmission of more than 70% of visible light.) For the protective film to have better clarity it is necessary that the oxygen-to-nitrogen ratio be high. For the protective film to have better chemical resistance, especially better alkali resistance, it is necessary that the nitrogen-to-oxygen ratio be high.

According to the present invention, the protective film of silicon oxynitride should have a thickness of 5 to 100 nm, preferably 10 to 100 nm. With a thickness smaller than 5 nm, the protective film is poor in wear resistance. With a thickness larger than 100 nm, the protective film causes the heat-screening glass to look deeply tinted, which is unfavorable to the heat-screening glass for automotive windows.

The heat-screening glass of the present invention has a heat-screening film between the transparent sheet glass and the protective film. This heat-screening film is not specifically limited so long as it is capable of transmitting a part of visible light and reflecting a part of infrared rays (or it is capable of screening a part of solar rays). The heat-screening film may be composed of two transparent layers of different dielectric materials, one having a lower refractive index and the other having a higher refractive index. The combination of a low refractive index layer and a high refractive index layer is possible in several ways as follows: stannic oxide layer and titanic oxide layer; zirconium oxide layer and titanic oxide layer; silicon dioxide layer and titanic oxide layer; aluminum oxide layer and titanic oxide layer; and tantalum pentoxide layer and titanic oxide layer.

The heat-screening film may also be a single layer of metal nitride such as titanium nitride, chromium nitride, or hafnium nitride. Moreover, the heat-screening film may be composed of an inner layer and two outer layers, said inner layer being of metal nitride such as titanium nitride, chromium nitride, zirconium nitride, or hafnium nitride, and said outer layers being of transparent dielectric material such as stannic oxide and titanic oxide. The heat-screening film of single layer structure is favorable to high productivity because it can be formed by a single step of coating. The metal nitride layer should have a thickness of from 1 to 10 nm so that it screens heat rays but transmits more than 70% of visible light.

The heat-screening glass of the present invention has a transparent sheet glass as the base. It may be a colorless or colored transparent sheet glass made by the float process. It may be replaced by a plastics plate.

The protective film of silicon oxynitride mentioned above can be formed by the sputtering process which employs a silicon target and a reactive gas composed of oxygen and nitrogen. The amount of oxygen and nitrogen introduced into the system is properly controlled so as to establish a proper oxygen-to-nitrogen ratio in the protective film. The ratio of oxygen in the reactive gas should preferably be 1 to 10%, depending on the rate of sputtering and the amount of residual gas in the chamber. The sputtering should preferably be carried out by direct current glow discharge.

The heat-screening film mentioned above can also be formed by any known sputtering process that employs direct current glow discharge. This process is favorable to uniform coating of sheet glass of large area.

The heat-screening glass of the present invention has a protective film of silicon oxynitride which exhibits good chemical resistance without an appreciable loss of visible light transmission.

EXAMPLES

The invention is now described with reference to the following examples and the accompanying drawing. FIG. 1 is a partial sectional view of the heat-screening glass of the present invention, in which there is shown the heat-screening glass 1 which is composed of a transparent sheet glass 2 and a heat-screening film 3 and a protective film of silicon oxynitride 4 formed one over the other on the transparent sheet glass 2.

EXAMPLE 1

A heat-screening glass was prepared using an in-line magnetron sputtering apparatus equipped with cathodes measuring 20 by 5 inches, one cathode provided with a titanium target and the other cathode provided with a silicon target. For coating of titanium nitride film (5 nm thick), a sheet glass was moved past the target at a prescribed speed in an atmosphere of nitrogen at a reduced pressure of 0.4 P. On the titanium nitride film was formed a protective film (20 nm thick) of silicon oxynitride using the silicon target in an atmosphere composed of 98 vol % nitrogen and 2 vol % oxygen. Thus there was obtained example 1 of heat-screening glass. Example 1 was tested for durability of the protective film. The results are shown in Table. Incidentally, glow discharge remained stable while the protective film was formed.

EXAMPLE 2

The same procedure as in Example 1 was repeated to give Example 2 of the heat-screening glass except that the protective film of silicon oxynitride was formed in an atmosphere composed of 90 vol % nitrogen and 10 vol % oxygen. Example 2 was tested for durability of the protective film. The results are shown in Table. Incidentally, glow discharge remained stable while the protective film was formed.

EXAMPLE 3

The same procedure as in Example 1 was repeated to give Example 3 of the heat-screening glass except that the protective film of silicon oxynitride was formed in an atmosphere composed of 98 vol % nitrogen and 2 vol % oxygen. Example 3 was tested for durability of the protective film. The results are shown in Table. Incidentally, glow discharge remained stable while the protective film was formed.

EXAMPLE 4

The same procedure as in Example 1 was repeated to give Example 4 of the heat-screening glass except that the protective film of silicon oxynitride was formed in an atmosphere composed of 90 vol % nitrogen and 10 vol % oxygen. Example 4 was tested for durability of the protective film. The results are shown in Table. Incidentally, glow discharge remained stable while the protective film was formed.

EXAMPLE 5

The same procedure as in Example 1 was repeated to give Example 5 of the heat-screening glass except that the protective film of silicon oxynitride was formed in an atmosphere composed of 95 vol % nitrogen and 5 vol % oxygen. Example 5 was tested for durability of the protective film. The results are shown in Table. Incidentally, glow discharge remained stable while the protective film was formed.

EXAMPLE 6

The same procedure-as in Example 1 was repeated to give Example 6 of the heat-screening glass except that the protective film of silicon oxynitride was formed in an atmosphere composed of 95 vol % nitrogen and 5 vol % oxygen. Example 6 was tested for durability of the protective film. The results are shown in Table. Incidentally, glow discharge remained stable while the protective film was formed.

COMPARATIVE EXAMPLE 1

The same procedure as in Example 1 was repeated to give comparative Example 1 of the heat-screening glass except that the protective film was formed in an atmosphere of nitrogen alone. Comparative Example 1 was tested for durability of the protective film. The results are shown in Table. Incidentally, glow discharge remained stable while the protective film was formed.

COMPARATIVE EXAMPLE 2

The same procedure as in Example 1 was repeated to give comparative example 2 of the heat-screening glass except that the protective film was formed in an atmosphere of oxygen alone. Comparative Example 2 was tested for durability of the protective film. The results are shown in Table. Incidentally, glow discharge was unstable while the protective film was formed.

| | Nitride composed of film | Thickness (nm) | Thickness of protective film (nm) | Optical characteristics | | Solar ray transmission (%) | Protective film $SiO_xN_y$ | | | | Resistance[1] taber abrasion | | Alkali[3] resistance (Days) | Forming condition of sputtering Ratio of $N_2/O_2$ |
|---|---|---|---|---|---|---|---|---|---|---|---|---|---|---|
| | | | | Visible light | | | Atomic ratio | | Optical[2] index | | | | | |
| | | | | Transmission (%) | Reflectance (%) | | X | Y | n | k | ΔYa (%) | ΔH (%) | | |
| Example | | | | | | | | | | | | | | |
| 1 | TiN | 5 | 20 | 70.0 | 9.8 | 62.7 | 0.65 | 0.67 | 1.85 | 0 | 1.5 | 0.8 | 8 | 98/2 |
| 2 | TiN | 5 | 20 | 71.3 | 8.8 | 64.6 | 1.25 | 0.05 | 1.47 | 0 | 1.6 | 0.8 | 6 | 90/10 |
| 3 | ZrN | 5 | 20 | 71.4 | 10.2 | 62.2 | 0.65 | 0.67 | 1.85 | 0 | 1.5 | 0.9 | 8 | 98/2 |
| 4 | ZrN | 5 | 20 | 71.4 | 9.1 | 64.4 | 0.65 | 0.05 | 1.47 | 0 | 1.7 | 0.9 | 6 | 90/10 |
| 5 | CrN | 5 | 20 | 70.5 | 10.2 | 64.4 | 0.83 | 0.42 | 1.62 | 0 | 1.6 | 1.1 | 7 | 95/5 |
| 6 | HfN | 5 | 20 | 70.5 | 10.2 | 64.4 | 0.83 | 0.42 | 1.62 | 0 | 1.6 | 1.1 | 7 | 95/5 |
| Comparative | | | | | | | | | | | | | | |

| | Nitride composed of film | Thickness (nm) | Thickness of protective film (nm) | Visible light Transmission (%) | Visible light Reflectance (%) | Solar ray transmission (%) | Protective film $SiO_xN_y$ Atomic ratio X | Protective film $SiO_xN_y$ Atomic ratio Y | Optical[2] index n | Optical[2] index k | Resistance[1] taber abrasion ΔYa (%) | Resistance[1] taber abrasion ΔH (%) | Alkali[3] resistance (Days) | Forming condition of sputtering Ratio of $N_2/O_2$ |
|---|---|---|---|---|---|---|---|---|---|---|---|---|---|---|
| Example | | | | | | | | | | | | | | |
| 1 | TiN | 5 | 20 | 70.5 | 11.2 | 63 | 0.4 | 0.94 | 2 | 0 | 2.5 | 4.0 | 10 | 100/0 |
| 2 | TiN | 5 | 20 | 70.8 | 8.5 | 64.1 | 1.4 | 0 | 1.46 | 0 | 1.3 | 0.8 | 0.5 | 0/100 |

[1] ΔYa and ΔH are change in visbible light transmission (%) and Haze (%) after Taber abrasion test, respectively.
[2] n and k are refractive index and absorption coefficient, respectively.
[3] Alkali resistance is expressed in terms of days required for the sample to decrease in visible light transmission by 1% when dipped in 0.1N HaOH solution at room temperature.

It is noted from Table that Example 1 and 6 are superior in wear resistance and alkali resistance to those in Comparative Examples 1 and 2.

The heat-screening glass of the present invention can be used alone for window glass owing to the protective film which has both good wear resistance and chemical resistance. Since the protective film is thin and only slightly tinted, the heat-screening glass is suitable for automotive window glass.

Having described a specific preferred embodiment of the present invention with reference to the accompanying drawing, it is to be understood that the invention is not limited to that precise embodiment, and that various changes and modifications may be effected therein by one skilled in the art without departing from the scope or spirit of the invention as defined in the appended claims.

What is claimed is:

1. A heat-screening glass comprising a transparent sheet glass and a heat-screening film and a protective film coated one over the other on said sheet glass, said protective film comprising silicon oxynitride represented by the formula $SiO_xN_y$ where x ranges from 0.65 to 1.25 and y ranges from 0.05 to 0.67, said protective film having a thickness of from 5-100 nm and being transparent to wavelengths of visible light, and said heat-screening film having a thickness of from 1-10 nm, wherein said heat screening glass is transparent to wavelengths of visible light.

2. A heat screening glass as claimed in claim 1, wherein the heat-screening film is made of at least one member of titanium nitride, chromium nitride, zirconium nitride, or hafnium nitride.

3. A heat-screening glass as claimed in claim 1, wherein said protective film has a thickness of 10 to 100 nm.

4. A heat-screening glass as claimed in claim 1, wherein said protective film has an optical index of from 1.47 to 1.85.

* * * * *